Figure 1:
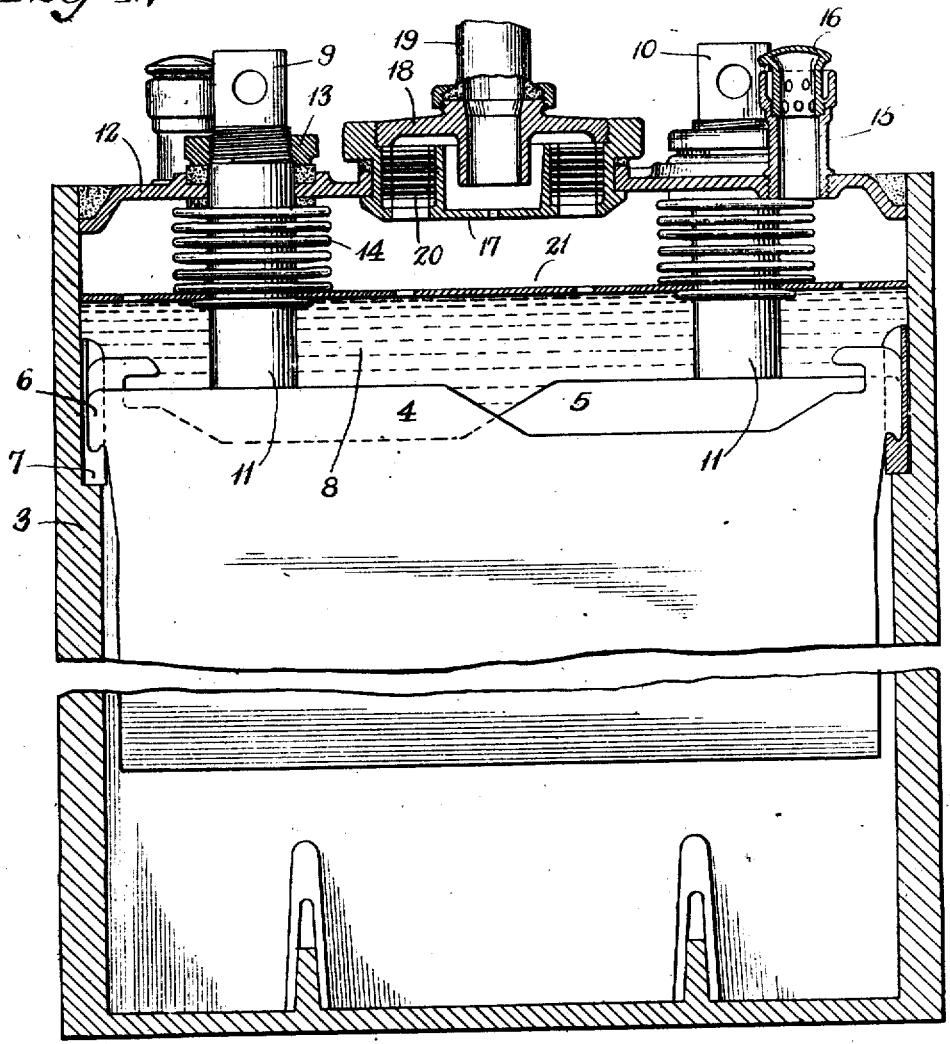

C. H. BEDELL.
STORAGE BATTERY INSTALLATION.
APPLICATION FILED DEC. 22, 1916.

1,313,513.

Patented Aug. 19, 1919.
2 SHEETS-SHEET 1.

INVENTOR.
C. H. Bedell,
BY
ATTORNEYS.

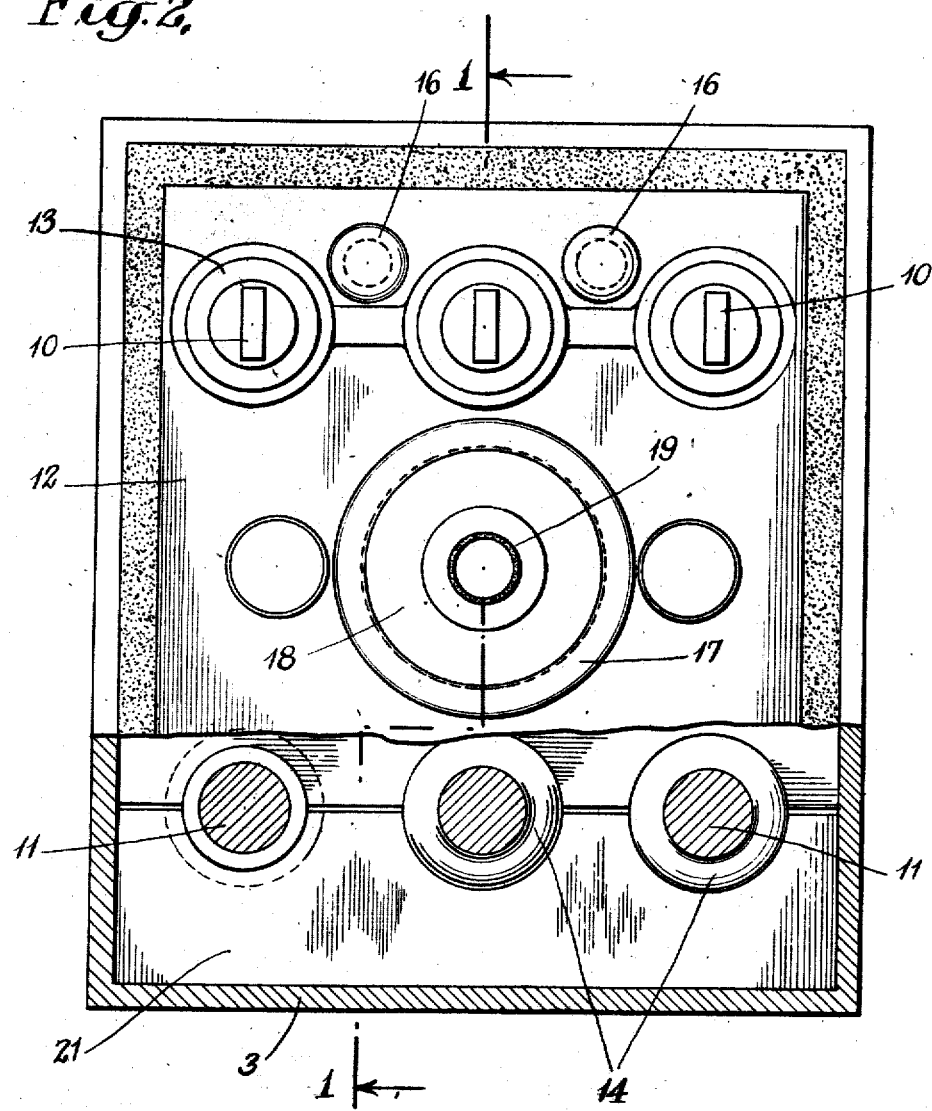

UNITED STATES PATENT OFFICE.

CHARLES H. BEDELL, OF NEW LONDON, CONNECTICUT, ASSIGNOR TO ELECTRIC BOAT COMPANY, A CORPORATION OF NEW JERSEY.

STORAGE-BATTERY INSTALLATION.

1,313,513.   Specification of Letters Patent.   Patented Aug. 19, 1919.

Application filed December 22, 1916. Serial No. 138,366.

*To all whom it may concern:*

Be it known that I, CHARLES H. BEDELL, a citizen of the United States, residing at New London, county of New London, and State of Connecticut, have invented certain new and useful Improvements in Storage-Battery Installations; and I do hereby declare the following to be a full, clear, and exact description of the invention, such as will enable others skilled in the art to which it appertains to make and use the same.

This invention relates to storage battery installations and is directed particularly to the provision of an improved construction for such an installation whereby gases generated within the battery are diluted and carried off, whereby overheating of a cell is guarded against, and whereby evaporation of the electrolyte is reduced to a minimum. The invention is adapted for use in storage batteries of various constructions and for various uses, but it is of special utility in the storage batteries of submarine boats.

In an application for Letters Patent filed by me and Grant E. Edgar on November 30, 1915, Serial Number 64,380, a process of and apparatus for treating storage battery installations is described, involving establishing a current of air which is subdivided into a plurality of streams, one for each cell of the battery, and mixing each stream of air with the gases from the corresponding cell, while keeping the stream of air out of contact with the electrolyte in the cell, so that the gases are diluted by being mixed with air and are carried off from the battery by the air. By this process and apparatus, the gases generated within a cell are rendered innocuous by being diluted with air, but the current of air employed for this purpose does not come into direct contact with the electrolyte and therefore the evaporation of the electrolyte is very much less than it otherwise would be.

The present invention is directed to the provision of an improved construction for practising the process described in the application above referred to. This apparatus is distinctive in that the air employed for diluting and carrying off the battery gases is carried directly into the several cells, as has been the common practice in batteries for submarine boats as heretofore constructed. This air, however, is not permitted to come into direct contact with the surface of the electrolyte in the cells, for in that case evaporation of the electrolyte would take place with objectionable rapidity. Instead a diaphragm is provided at or close to the surface of the electrolyte in the cell, so that the air which passes through the upper portion of the cell above this diaphragm is kept out of contact with the surface of the electrolyte. The diaphragm is perforated at distributed points, so that the gases generated within the electrolyte pass freely through it to the space above, and the gases are therefore free to mix with the current of air, though the latter does not pass directly over the surface of the electrolyte.

Any suitable form of diaphragm may be employed for accomplishing the purposes above set forth, and various means may be employed for mounting the diaphragm in position. I prefer, however, to employ a diaphragm consisting of a sheet of wood veneer, and to sustain this in position by mounting it upon the terminal posts by which electrical connection is made through the cover of a cell about the plates immersed in the electrolyte.

With a multiplicity of cells constructed in this manner, the current of air established for carrying off the battery gases is subdivided into a multiplicity of streams, one for each cell, and each stream of air passes into the corresponding cell, across the space at the top thereof and then out, the several streams being united after passing through their respective cells in a duct which leads to the exterior. Each stream of air takes up the gas within its cell, dilutes it and carries it off; but while passing through the upper portion of the cell, the stream of air does not contact directly with the surface of the electrolyte and therefore evaporation of the electrolyte is minimized.

The invention will be better understood by referring to the following description taken in connection with the accompanying drawings which show one form in which the invention may be utilized. It will be understood, however, that the invention is not limited to any one form, but on the contrary may be utilized in storage battery cells differing widely as to their structural characteristics.

In these drawings, Figure 1 is a vertical section of a storage battery cell, the line of the section being indicated by the line 1—1 on Fig. 2, and Fig. 2 is a plan view, broken away and sectioned in part, of the cell shown in Fig. 1.

Referring to these drawings, the cell consists of a casing 3 within which are mounted a plurality of positive and negative plates 4 and 5. These plates are mounted within the casing in any suitable manner, such, for instance, as that indicated involving the provision of lugs 6 at the upper ends of the side edges of the plates bearing on rails 7 secured to the sides of the casing 3. The plates 4 and 5 are immersed in an electrolyte 8 which is preferably maintained at the level indicated in Fig. 1, though in practice the level of the electrolyte falls substantially below that indicated and periodic replenishment is necessary. Electrical connection to the plates 4 and 5 is made through terminal posts 9 and 10. Preferably all of the positive plates and all of the negative plates or all of certain groups of these plates are connected to transverse conductors 11 and each of these conductors 11 is integral with one or more of the terminal posts 9 and 10. In the drawings, one conductor 11 is shown as connected to all of the positive plates and another one to all of the negative plates, and each of these conductors 11 is secured to or integral with three terminal posts 9 and 10 which extend upwardly through openings in the cover 12 of the cell. Each terminal post 9 and 10 is secured to the cover 12 by means of a lock-nut 13 co-acting with suitable washers. Each of these terminal posts 9 and 10 may be so formed as to considerably extend the surface area of the portion of the post located within the cell above the level of the electrolyte therein, thereby largely increasing the cooling surface exposed to the air current passing through the upper part of the cell. For this purpose each terminal post is shown in the drawings as provided with a mutilplicity of thin flanges 14 of substantial size, these flanges being parallel and close together.

For the circulation of air through the upper portion of each cell of the battery to carry off heat and gases developed within the cell, each cell is provided with inlet and outlet openings through the cover thereof. Preferably, the upper ends of the cells enter within an air chamber from which air may pass freely through the inlet openings of the cells to the interior of the cells and each outlet opening of a cell is connected to a duct leading to the exterior of the battery. In the present instance, the cell is shown as provided with four inlet openings each consisting of a tube 15 inserted in a threaded opening in the cover 12 of the cell and each provided with a protective hood 16. A single outlet from the cell is arranged at the center of the cover 12 consisting of a circular plug 17 threaded into an opening in the cover 12, an annular member 18 seated in this plug and a conduit 19 connected to the member 18. These parts are so formed as to provide a tortuous passage for air and the gases carried thereby from the interior of the cell through the outlet to the duct 19, a plurality of baffle plates 20 being preferably provided within the plug 17. The air inlets and the outlet are preferably so located that the air passing through them and through the top of the cell is caused to flow in immediate proximity to the terminal posts 9 and 10 and over the extended cooling surfaces thereof. Thus, by reference to Fig. 2, it will be seen that there are three of the terminal posts arranged in line adjacent to opposite sides of the cell and four air inlet openings are provided each arranged between a pair of adjacent terminal posts and on the side thereof away from the central outlet opening.

The diaphragm heretofore referred to is shown at 21. It is mounted upon the terminal posts 9 and 10 as by utilizing for this purpose the lowest one of the flanges 14 on each of the several posts. The diaphragm 21 is mounted in a horizontal position at about the level of the surface of the electrolyte when the cell has been filled to the maximum extent. The diaphragm is provided with a plurality of holes through which the electrolyte rises if the cell is filled to an excessive extent and through which gases generated within the cell may rise to the upper portion of the cell. The diaphragm is preferably made from a sheet of wood veneer.

The moving body of air for carrying off the gases generated within the cells is established through the inclosed space into which the upper ends of the cells extend. Air passes from this space down through the inlets 15 into each of the several cells, thereby subdividing the body of air into a plurality of streams, one for each cell. Within the cell the air entering through the inlets 15 passes radially inward through the space at the top of the cell above the electrolyte therein and then passes out through the outlet passage 19. All these passages lead to a common duct by which the air and the gases borne thereby pass to the exterior. The gases developed within a cell rise to the space at the top of the cell passing through the openings shown in the diaphragm 21, and these gases mix with and are diluted by the moving body of air. In the passage of air across the top of the cell, the air does not contact directly with the surface of the electrolyte, but is prevented therefrom by the diaphragm 21, so that evaporation of the electrolyte takes place to a relatively small extent.

I claim:

1. A storage battery cell having a casing, a cover therefor, an electrolyte within the cell, plates immersed in the electrolyte, means for making electrical connection to the plates, inlet and outlet openings in the casing of the cell for the circulation of air through the upper portion of the cell to carry off gases rising from the electrolyte, and means for preventing the current of air passing through the upper portion of the cell between the inlet and outlet openings from coming in direct contact with the electrolyte, substantially as described.

2. A storage battery cell having a casing, a cover therefor, an electrolyte within the cell, plates immersed in the electrolyte, means for making electrical connection to the plates, inlet and outlet openings in the casing of the cell for the circulation of air through the upper portion of the cell, and a diaphragm mounted within the cell near the surface of the electrolyte therein for protecting the surface of the electrolyte from the air flowing through the upper portion of the cell between the inlet and outlet openings, substantially as described.

3. A storage battery cell having a casing, a cover therefor, an electrolyte within the casing, plates immersed in the electrolyte, terminal posts extending upward from the plates through openings in the cover of the casing, inlet and outlet openings for the circulation of air through the upper portion of the cell, and a thin diaphragm provided with a plurality of openings mounted upon the terminal posts parallel and adjacent to the surface of the electrolyte within the cell, substantially as described.

In testimony whereof I affix my signature, in presence of a witness.

CHARLES H. BEDELL.

Witness:
F. L. BRAKE.